United States Patent [19]

Zucker et al.

[11] Patent Number: 4,889,403
[45] Date of Patent: Dec. 26, 1989

[54] DISTRIBUTION OPTICAL FIBER TAP

[75] Inventors: Joseph Zucker, Foster City; Nelson M. Shen, Palo Alto; Bruce D. Campbell, Portola Valley, all of Calif.; Peder Rodhe, Gothenburg, Sweden; Tom Call, Columbus, Miss.

[73] Assignee: Raychem Corp., Menlo Park, Calif.

[21] Appl. No.: 137,317

[22] Filed: Dec. 23, 1987

Related U.S. Application Data

[63] Continuation-in-part of Ser. No. 117,390, Nov. 2, 1987, abandoned, which is a continuation-in-part of Ser. No. 53,209, May 21, 1987, abandoned.

[51] Int. Cl.[4] .................................................. G02B 6/26
[52] U.S. Cl. .................................. 350/96.15; 250/227; 350/96.18; 350/96.29
[58] Field of Search ............... 350/96.15, 96.16, 96.18, 350/96.20, 96.29; 250/227

[56] References Cited

U.S. PATENT DOCUMENTS

| | | | |
|---|---|---|---|
| 4,664,732 | 5/1987 | Campbell et al. | 350/96.15 X |
| 4,679,907 | 7/1987 | Campbell et al. | 350/96.15 X |
| 4,696,534 | 9/1987 | Saha | 350/96.15 |
| 4,696,535 | 9/1987 | Saha | 350/96.15 |
| 4,747,652 | 5/1988 | Campbell et al. | 350/96.15 |
| 4,759,605 | 7/1988 | Shen et al. | 350/96.15 |
| 4,765,704 | 8/1988 | Pers | 350/96.15 |
| 4,768,854 | 9/1988 | Campbell et al. | 350/96.16 |
| 4,790,617 | 12/1988 | Campbell et al. | 350/96.15 |

FOREIGN PATENT DOCUMENTS

| | | | |
|---|---|---|---|
| 2409455 | 9/1975 | Fed. Rep. of Germany | 350/96.15 |
| 3429947 | 2/1986 | Fed. Rep. of Germany | 350/96.15 |
| 0208236 | 3/1984 | German Democratic Rep. | 350/96.15 |
| 2142157 | 1/1985 | United Kingdom | 350/96.15 |

Primary Examiner—John D. Lee
Attorney, Agent, or Firm—Dennis E. Kovach; Herbert G. Burkard

[57] ABSTRACT

An optical fiber read or write tap includes a substrate having a substantially flat upper surface on which two separated grooves are formed, a light element being disposed in the second groove so as to be capable of coupling light with a bent portion of an optical fiber disposed in the first groove.

17 Claims, 3 Drawing Sheets

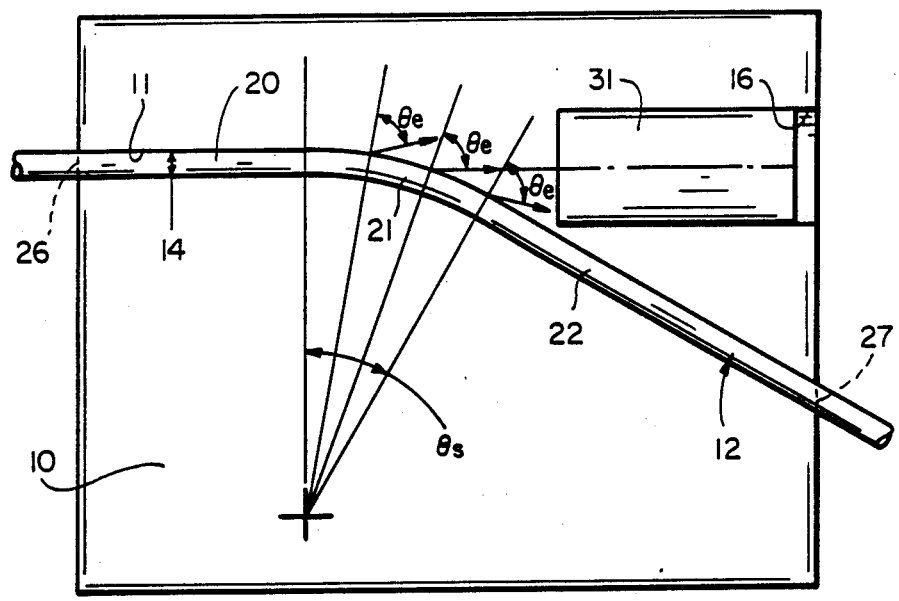
FIG_1
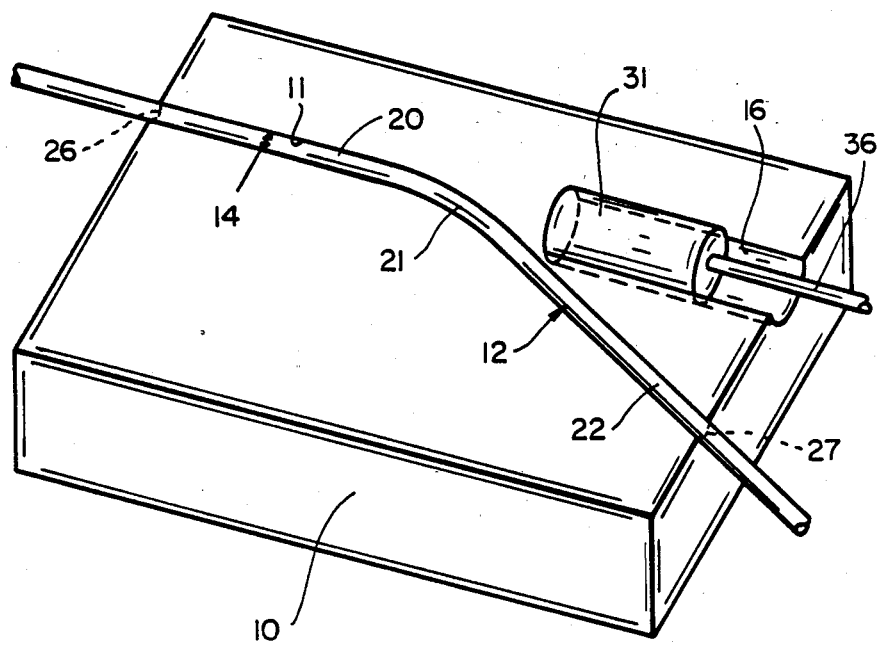
FIG_2

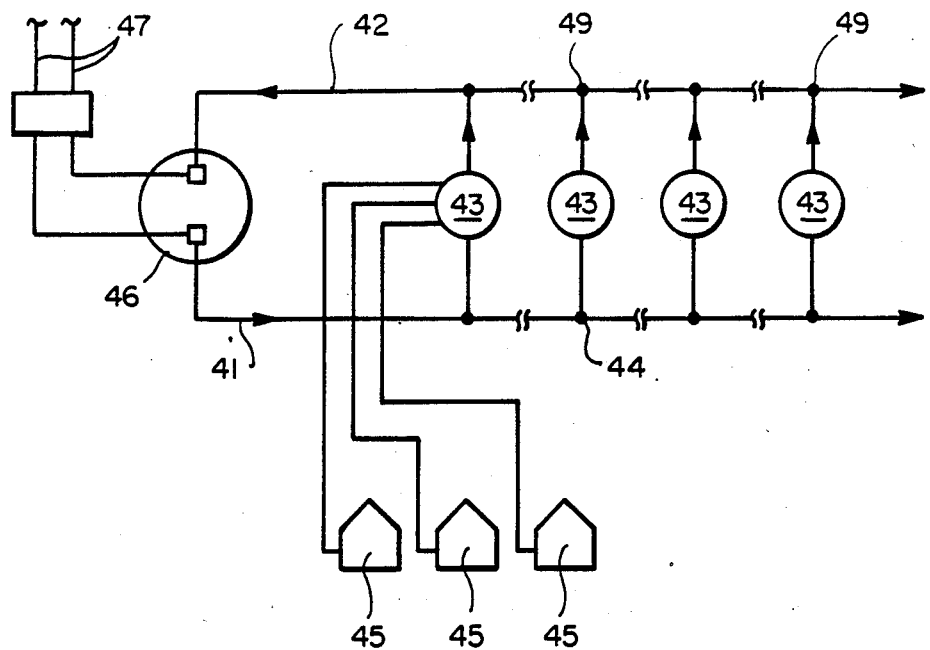
FIG_3
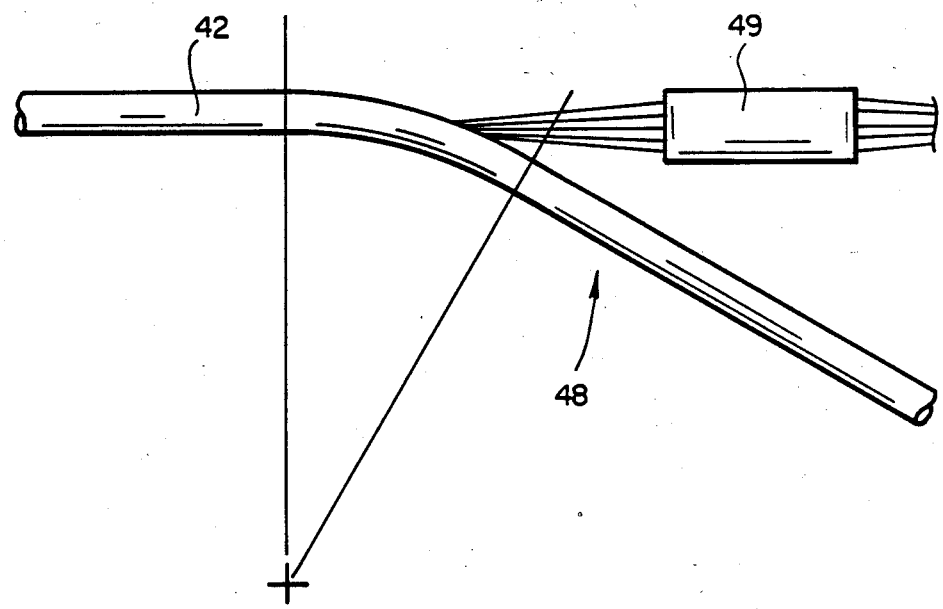
FIG_4

DISTRIBUTION OPTICAL FIBER TAP

REFERENCE TO RELATED APPLICATION

The present application is a continuation-in-part of U.S. Ser. No. 117,390, filed Nov. 2, 1987, which is a continuation-in-part of U.S. Ser. No. 053,209, filed May 21, 1987, (both now abandoned), the disclosures of which are incorporated herein by reference.

BACKGROUND OF THE INVENTION

The present invention relates to a tap for an optical fiber, networks usable therewith, and optimum geometries therefor.

In recent years significant efforts have been directed towards devising methods and apparatuses for tapping optical fibers for distribution networks, and although many of the methods proposed show interesting experimental results, a common disadvantage of all prior art proposals is that the methods and apparatuses suggested are either too complex in design to be cost effective, are unduly difficult to install, are not sufficiently optically efficient, or create system hazards such as undue strain on an optical fiber which causes premature failure thereof.

Goell et al., U.S. Pat. No. 3,982,123 discloses various methods for tapping an optical fiber through a side thereof, these methods requiring that either a fiber coating, or a fiber coating and its cladding be removed. This has proved disadvantageous when used in conjunction with optical fibers including glass cores and glass claddings since removal of the coating and/or the fiber cladding exposes either the glass cladding or the glass core to OH ions in the atmosphere which quickly degrades the strength of the optical fiber.

Miller, G. B. U.S. Pat. No. 2,126,749B discloses a method for tapping an optical fiber while leaving its coating intact, the method comprising disposing the optical fiber within a transparent light pipe, creating a bend in the optical fiber either upstream of the light pipe or within the light pipe, and disposing an optical detector at a remote end of the light pipe. Miller further teaches that the fiber be bent about a radius of curvature of less than 1 mm, and that the fiber bend subtend an angle of greater than 10°. These teachings are disadvantageous since a bend radius of less than 1 mm is extremely detrimental to the life of an optical fiber, even if its coating is left intact, thus rendering taps constructed as such undesirable for distribution networks wherein the optical fiber bend profile remains static over time. In addition, such a small bend radius also puts the fiber under sufficient strain such that its buffer coating tends to relax over time which changes the bend profile and hence changes the optical coupling efficiency of the tap with time. Finally, the Miller tap is difficult to make in quantities in a cost efficient manner, and also very craft sensitive to install.

Dakin et al., "Experimental Studies into the Non-Invasive Collection and Distribution of Data on a Fiber-Optic Monomode Bus" describes a method for sequentially tapping an optical fiber in series by bending a highway bus fiber about an arc, and disposing a polymer tapping fiber on an outside bend surface of the highway fiber, the polymer fiber having a 200 micron wide flat surface machine formed thereon to facilitate optical coupling with the bus fiber. Though Dakin et al. specifies favorable results, the construction of the taps proposed is extremely complex and difficult to make and install so as to achieve repeatable results.

SUMMARY OF THE INVENTION

Accordingly, it is an object of the present invention to provide an improved tap which is easy and inexpensive to manufacture, craft insensitive to install, extremely efficient, and capable of yielding repeatable results in the field.

These and other objects are achieved by an apparatus, comprising:

a first optical fiber tap, the first tap including:

a substrate having a substantially flat upper surface on which a curved first groove is formed and on which a second groove is formed, a first end of the second groove being displaced from and confronting the first groove;

an optical fiber including a core surrounded by a cladding surrounded by a coating disposed at least partially within the first groove, a width of the groove being substantially greater than a cladding diameter and such that a bend profile of the coating is maintained substantially constant;

means for collecting light radiating from a bent portion of the optical fiber which passes through the fiber coating and into the substrate from the first groove, the light collecting means including a light collection element disposed within the second groove so that a light collection end surface thereof is adjacent the first end of the second groove;

a bend radius of the intermediate portion of the optical fiber being between 4 and 11 millimeters and its sector angle being greater than 9° and less than 35°.

Preferably, the light collecting means includes means for reducing a spot size of the radiating light to an area having a size about equal to a circle having a diameter less than 500 um, preferably less than 300 um, more preferably less than 100 um, optimally less than 80 um, e.g. less than 50 um, the invention being most suitable for withdrawing light from a single mode fiber, though it is useful with multimode fiber as well.

More preferably, a radius of curvature and sector angle over which an intermediate portion of the optical fiber is bent within the first groove being such that a total signal loss induced by the first tap to a signal in the fiber is less than 0.7 dB, the sector angle being between 9° and 35°, optimally between 9° and 28°.

According to a further embodiment, a resiliently deformable gel is disposed in the first groove and is in intimate contact with the coating of the intermediate bent portion of the optical fiber so as to function as an optical coupler. Preferably, the tap includes a top disposed over the substrate with means for securing the optical fiber within the first groove when disposed over the substrate.

According to a preferred embodiment, a pigtail optical fiber is connected to a remote end of the light collection element. Also, preferably for bus applications where a plurality of N taps are disposed in series on the fiber, each tap creates a total insertion loss less than 0.5 dB, preferably less than 0.3 dB, more preferably less than 0.2 dB, optimally less than 0.1 dB.

The invention further includes taps for injecting light into an optical fiber core, particularly in a serial manner.

BRIEF DESCRIPTION OF THE DRAWINGS

FIG. 1 illustrates a plan view of a first embodiment of the invention;

FIG. 2 illustrates a perspective view of the embodiment of FIG. 1;

FIG. 3. illustrates a network utilizing the invention; and

FIG. 4 illustrates another embodiment of the present invention.

DESCRIPTION OF THE PREFERRED EMBODIMENTS

The invention is most suitable for tapping optical fibers including a core, surrounded by a cladding, surrounded by a buffer and one or more thin jacket layers, the core and cladding preferably being made of glass, the buffer and jacket layers being preferably made of polymers, the optical fiber preferably being a monomode optical fiber, though the invention is suitable for use with multimode optical fibers as well. Typically, monomode optical fibers most suitable for the invention are those having core diameters of the range of 5 to 12 microns, and cladding diameters of the order of 80 to 140 microns, a preferred cladding diameter currently in use being 125 microns, with multimode fibers having similar cladding diameters and core diameters between 40 and 100 microns. The invention will first be described by specific reference to a design most suitable for use with a monomode optical fiber having a glass core, a glass cladding, and a polymeric buffer, the buffer preferably having an index of refraction throughout its thickness which is equal to or greater than the cladding, acrylate buffers fulfilling this criteria. As is well known, the index of refraction of the cladding is less than that of the core.

FIG. 1 illustrates a plan view of a first embodiment of the invention, with FIG. 2 illustrating a perspective view of this embodiment. Referring to these Figures, a transparent body 10 made of a material with a high index of refraction, such as polycarbonate glass, Lucite, fused quartz, or other material with an index of refraction preferably equal to the fiber outer coating, next preferably higher than the outer coating, and at least higher than the cladding, has a groove 11 formed on its upper surface which extends between opposite ends 26, 27 of the substrate and receives a buffered fiber 12 snugly. Specifically, a width 14 of a widest portion of the groove is such that it is about the same as, slightly larger than, or preferably slightly smaller than an outside diameter of the fiber buffer and larger than the fiber cladding. For example, preferred embodiments would be to utilize a groove having a maximum width 14 which is 2%, 4%, 6%, 8%, or 10% less than a width of the fiber buffer, with 2% or 4% being particularly preferred. A cross-sectional profile of the groove can be V-shaped, square shaped, or trapezoidal shaped, as desired, with other shapes being possible as well. The groove 11 has a straight portion 20, a curved portion 21 having a sector angle $\theta_s$, and another straight section 22.

A light collection element 31 is fixed to the body 10 within a second groove 16, the axis of which makes an angle $\theta_e$ with respect to the radius of the curved portion 21 of the first groove 11 at the point of intersection of this axis and the arc. A pickup fiber or pigtail optical fiber 36 of suitable core diameter and numerical aperture is positioned at a focus of the light collection element 31, the pigtail optical fiber preferably having a step index of refraction profile, though a graded index of refraction profile is included within the scope of the invention.

For a monomode fiber having a core radius $r_c$, a cladding radius $r_{ce}$, a buffer radius $r_b$, a macrobend radius R, and index of refraction of the bound mode $n_c$, a cladding index of refraction $n_{ce}$, a buffer index of refraction $n_b$, a matching medium index of refraction $n_e$ and a fiber sector angle of $\theta_s$, it can be shown through the application of Snell's law to each interface the light must traverse that the light is radiated out of the monomode optical fiber bend at an angle $$\theta_e = \arcsin\left[\frac{n_c}{n_e} / \left(1 + \frac{r_c}{R}\right)\right] \qquad \text{1a}$$

and out of a multimode optical fiber bend at an angle $$\theta_a = \arcsin\left[\frac{(R + r_c) n_{ce}}{(R + r_b) n_e}\right]$$

In the case of the bent monomode fiber, the velocity of the plane wavefront associated with the guided mode must increase with radial distance from the center of curvature until a critical distance is reached in the cladding for which the phase velocity would have to exceed the velocity of light in the cladding. It can be shown that this distance is $R' = Rn_c/n_{ce}$. All the power in the guided mode of the straight fiber beyond this critical radius is radiated out of the guided mode in the bent fiber.

In the case of the multimode fiber, the highest order mode, which is tangent to the core-cladding interface, is radiated out of the guided modes.

It can also be shown that the minimize sector angle that will allow light to exit the fiber for a monomode fiber is $$\theta_{min} = \arccos\left[\frac{R + r_c}{R + r_{ce}}\right]$$

and for a multimode fiber, $$\theta_{min} = \arccos\left[\frac{R + r_c}{R + r_{ce}}\right]$$

If we assume that the power that may be intercepted by the detector is radiated from the arc starting at $\theta_{min}$ and ending at $\theta_s$, and if reflections are disregarded, then the efficiency is $$E \geq \frac{\theta_s - \theta_{min}}{\theta_s}$$

In actuality, the actual efficiency is less by a few percent due to reflections at the cladding-buffer and buffer-external medium interfaces. Nevertheless, this is a lower limit on the efficiency since some light also radiates out of the straight portion beyond the bend.

EXAMPLE 1

For a monomode optical fiber sold under the trade name Corguide and obtained from Corning, and having a core radius 5 micrometers, a cladding radius 62.5 micrometers, a buffer radius 125 micrometers, a macrobend radius R, a core index of refraction 1.4628, a cladding index of refraction 1.4584, a buffer index of refraction 1.53, a matching medium index of refraction 1.53, for a variety of radiuses and sector angles, the following values were tabulated, with E being the amount of light detected divided by the amount of light withdrawn, in percent.

TABLE 1

| R(mm) | $\Theta_e$ | $\Theta_{min}$ | $\Theta_s$ | E(%) |
|---|---|---|---|---|
| 4 | 68 | 11.3 | 19 | 40.5 |
| 4.2 | 68.2 | 10.97 | 19 | 42.3 |
| 4.4 | 68.4 | 10.64 | 19 | 44 |
| 4.6 | 68.6 | 10.33 | 19 | 45.6 |
| 4.8 | 68.7 | 10.03 | 19 | 47.2 |
| 5.0 | 68.9 | 9.76 | 19 | 48.6 |
| 5.2 | 69 | 9.5 | 19 | 50 |
| 5.4 | 69.1 | 9.25 | 19 | 51.3 |
| 5.6 | 69.3 | 9.02 | 19 | 52.5 |
| 5.8 | 69.4 | 8.8 | 19 | 53.7 |

If the matching medium is plexiglass, whose index of refraction is Ne=1.491, the following values were tabulated:

TABLE 2

| R(mm) | $\Theta_e$ | $\Theta_{min}$ | $\Theta_s$ | E(%) |
|---|---|---|---|---|
| 5 | 73.2 | 10.4 | 19 | 45.4 |
| 5.2 | 73.3 | 10.1 | 19 | 46.8 |
| 5.4 | 73.5 | 9.8 | 21 | 53.1 |
| 5.6 | 73.7 | 9.6 | 21 | 54.3 |
| 5.8 | 73.8 | 9.4 | 21 | 55.4 |
| 6.0 | 74.0 | 9.1 | 21 | 56.5 |

For a bus network having N taps with a first tap being closest to an optical transmitter and an Nth tap being furthest from the optical transmitter, it has been discovered that when the taps are identical, optimum network performance is realized when an optical power within the optical fiber immediately prior to the Nth tap is a maximum. For a constant bend radius of 5.2 mm, and for N=24, the maximum power in the fiber immediately prior to the Nth tap was achieved by a sector angle of 19°. Using the components used for Example 1, the power delivered to the 24th tap was 24.3 dB down from the input power. Accordingly, it has been determined an optimum bend radius is between 4 and 11 mm, preferably between 5 and 10 mm, most preferably between 5 and 8 mm. An optimum bend sector angle is between 8° and 28°, preferably between 14° and 25°, most preferably between 16° and 23°. Also, an optimum value of $\theta_e$ (the angle an axis of the light collector forms with a normal to the fiber at its intersection therewith) is between 65 and 75, preferably between 68 and 73, most preferably between 68.3 and 70 (for Ne=1.53), and most preferably between 72 and 75 for Ne=1.491.

A further preferred embodiment of the invention utilizes a funnel as a light collecting element, the funnel having first and second ends, with the first end collecting light withdrawn from the bent optical fiber, this light being condensed down to a spot size equal to a cross-sectional area of the second end. This embodiment of the invention is useful where a small light spot size is especially desirable for high speed data transmission since an unduly large light spot size creates an undesirably large capacitance in the detector which limits the maximum speed at which data can be detected with acceptably low minimum bit error rates. According to the invention, the spot size has an area which is smaller than that of a circle having a diameter less than 500 um, preferably less than 300 um, more preferably smaller than 100 um, even more preferably smaller than 80 um, especially smaller than 50 um, most preferably smaller than 20 um. With a spot size of 50 um in diameter, speeds approximately equal to 1.5 gigabits can be handled with acceptable bit error rates (e.g. less than 1 error in $10^9$).

FIG. 3 illustrates a distribution architecture useful with the invention, the architecture including a read optical fiber 41, a write optical fiber 42, and a plurality of terminals 43 interconnected to the read and write optical fibers 41, 42 via a plurality of taps 44 constructed so as to have a geometry like that of any of the embodiments previously described. One or more of the terminals 43 can be connected to other remote terminals, such as houses 45, with the houses 45 including telephones, computers, or other telecommunication equipment, and even include equipment requiring only one-way communication, such as reception, for example as in the case of CATV television. Information is received by the terminals 43 from the read bus 41 by any one of the taps described, and information is sent back to a head end 46 when necessary, the head end communicating with other terminals via lines 47 outside the network.

For writing information onto the write bus 42, preferably tap 48 is designed as illustrated in FIG. 4 so as to inject light into the bend, using an appropriate focusing source 49 in communication with a light source 51 such as a laser or light emitting diode, or pigtail fiber thereof. Optimally, the geometric design of the write taps is similar to that of the read taps with the major exception that the light detector is replaced with a light emitter, such as a laser or LED.

Though the invention has been described by reference to certain preferred embodiments thereof, the invention is not to be so limited, and is to be limited only by the appended claims.

What is claimed is:

1. An apparatus, comprising:
   a first optical fiber tap, the first tap including:
      a substrate having a substantially flat upper surface on which a curved first grooved is formed and on which a second groove is formed, a first end of the second groove being displaced from and confronting the first groove;
      an optical fiber including a core surrounded by a cladding surrounded by a coating disposed at least partially within the first groove, a width of the first groove being substantially greater than a cladding diameter and such that a bend profile of the coating is maintained substantially constant;
      means for collecting light radiating from a bent portion of the optical fiber which passes through the fiber coating and into the substrate from the first groove, the light collecting means including a light collection element disposed within the second groove so that a light collection end surface thereof is adjacent the first end of the second groove;
      a bend radius of an intermediate portion of the optical fiber in the first groove being between 4 and 11 millimeters and its sector angle being greater than 9° and less than 35°.

2. The apparatus of claim 1, a radius of curvature and sector angle over which an intermediate portion of the optical fiber is bent within the first groove being such that a total signal loss induced by the first tap to a signal in the fiber is less than 0.7 dB, the sector angle being between 9° and 28°.

3. The apparatus of claim 1, the light collecting means including means for reducing a spot size of the radiating light to a cross-sectional area less than a circle having a diameter of 500 um.

4. The apparatus of claim 3, the diameter being smaller than 100 um.

5. The apparatus of claim 3, the light collection element including a lens disposed so as to extend from the first end of the second groove, and a pigtail optical fiber having a front end displaced from a back end of the lens at a focal point thereof.

6. The apparatus of claim 5, the pigtail optical fiber comprising a step index optical fiber or graded index fiber.

7. The apparatus of claim 3, further comprising a top disposed over the substrate and having means for securing the optical fiber within the first groove when disposed over the substrate.

8. The apparatus of claim 7, the first groove extending between opposite edges of the substrate.

9. The apparatus of claim 1, the optical fiber comprising a single mode fiber.

10. The apparatus of claim 1, the optical fiber comprising a multimode fiber.

11. The apparatus of claim 1, the coating at the intermediate bent portion of the optical fiber having an index of refraction throughout its thickness which is higher than an index of refraction of the cladding.

12. The apparatus of claim 1, further comprising:
a light transmitter connected to a first end of the optical fiber; and
a plurality of N optical fiber taps similar in construction to the first optical fiber tap, the plurality of optical fiber taps being disposed on the optical fiber in series so as to form a read bus, N being an integer and being greater than 3.

13. The apparatus of claim 1, the first tap further comprising a resiliently deformable gel disposed in the first groove and in intimate contact with the coating of the intermediate bent portion of the optical fiber so as to function as an optical coupler.

14. The apparatus of claim 1, the light collection element comprising a pigtail optical fiber disposed so that its front end is adjacent the first end of the second groove, the pigtail optical fiber having a core less than 100 microns.

15. The apparatus of claim 1, the sector angle being between 9° and 28°.

16. The apparatus of claim 15, further comprising:
a light receiver connected to an end of the optical fiber; and
a plurality of N optical fiber taps similar in construction to the first optical fiber tap, the plurality of optical fiber taps being disposed on the optical fiber in series so as to form a write bus, N being an integer greater than 3.

17. An apparatus, comprising:
a first optical fiber tap, the first tap including:
a substrate having a substantially flat upper surface on which a curved first groove is formed and on which a second groove is formed, a first end of the second groove being displaced from and confronting the first groove;
an optical fiber including a core surrounded by a cladding surrounded by a coating disposed at least partially within the first groove, a width of the first groove being substantially greater than a cladding diameter and such that a bend profile of the coating is maintained substantially constant;
means for generating light disposed within the second groove;
means for focusing light generated by the generating means, the focusing means being disposed in the second groove;
a bend radius of an intermediate portion of the optical fiber in the first groove being between 4 and 11 millimeters and its sector angle being greater than 9° and less than 35°.

* * * * *